United States Patent
Rochkind

Patent Number: 5,875,401
Date of Patent: Feb. 23, 1999

[54] METHOD AND APPARATUS FOR INITIATING WIRELESS MESSAGES

[75] Inventor: Mark Meier Rochkind, Morristown, N.J.

[73] Assignee: AT & T Corp., Middletown, N.J.

[21] Appl. No.: 680,333

[22] Filed: Jul. 12, 1996

[51] Int. Cl.$^6$ .................................................. G08B 5/22
[52] U.S. Cl. ........................ 455/466; 455/413; 455/415
[58] Field of Search .................................. 455/466, 413, 455/415, 450, 31.2

[56] References Cited

U.S. PATENT DOCUMENTS

| | | | |
|---|---|---|---|
| 3,703,708 | 11/1972 | Foster | 340/172.5 |
| 3,835,260 | 9/1974 | Prescher et al. | 179/18 ES |
| 4,313,035 | 1/1982 | Jordan et al. | 179/18 BE |
| 4,395,594 | 7/1983 | Meyerle | 179/2 EB |
| 4,430,755 | 2/1984 | Nadir et al. | 455/77 |
| 4,878,240 | 10/1989 | Lin et al. | 379/67 |
| 4,942,598 | 7/1990 | Davis | 379/57 |
| 4,994,797 | 2/1991 | Breeden | 340/825 |
| 5,113,430 | 5/1992 | Richardson, Jr. et al. | 379/88 |
| 5,193,110 | 3/1993 | Jones et al. | 379/94 |
| 5,210,789 | 5/1993 | Jeffus et al. | 379/127 |
| 5,243,645 | 9/1993 | Bissell et al. | 379/211 |
| 5,272,748 | 12/1993 | Davis | 379/63 |
| 5,278,539 | 1/1994 | Lauterbach et al. | 340/539 |
| 5,307,399 | 4/1994 | Dai et al. | 379/57 |
| 5,317,627 | 5/1994 | Richardson, Jr. et al. | 379/88 |
| 5,323,444 | 6/1994 | Ertz et al. | 379/45 |
| 5,325,424 | 6/1994 | Grube | 379/94 |
| 5,327,486 | 7/1994 | Wolff et al. | 379/96 |
| 5,335,266 | 8/1994 | Richardson, Jr. et al. | 379/88 |
| 5,348,008 | 9/1994 | Bornn et al. | 128/642 |
| 5,353,331 | 10/1994 | Emery et al. | 379/58 |
| 5,355,403 | 10/1994 | Richardson, Jr. et al. | 379/88 |
| 5,375,161 | 12/1994 | Fuller et al. | 379/57 |
| 5,379,337 | 1/1995 | Castillo et al. | 379/45 |
| 5,392,336 | 2/1995 | Chang et al. | 379/93 |
| 5,392,342 | 2/1995 | Rosenthal | 379/211 |
| 5,404,231 | 4/1995 | Bloomfield | 358/400 |
| 5,438,614 | 8/1995 | Rozman et al. | 379/93 |
| 5,457,732 | 10/1995 | Goldberg | 379/57 |
| 5,469,496 | 11/1995 | Emery et al. | 379/58 |
| 5,479,478 | 12/1995 | Fath | 379/58 |
| 5,487,103 | 1/1996 | Richardson, Jr. et al. | 379/88 |
| 5,502,761 | 3/1996 | Duncan et al. | 379/142 |
| 5,506,887 | 4/1996 | Emery et al. | 379/58 |
| 5,508,707 | 4/1996 | LaBlanc et al. | 342/457 |
| 5,511,111 | 4/1996 | Serbetcioglu et al. | 379/67 |

Primary Examiner—David R. Hudspeth
Assistant Examiner—Daniel Abebe

[57] ABSTRACT

A communications system allows special messages to be transmitted to a wireless device subscriber if certain conditions are met. Identification information authenticating the sender may be sent using an originating device, such as a personal computer with a modem. A location information generating device, such as the ANI generator in a telephone end-office connected by physical telephone wire (local loop) to the computer, generates location information. The identification information and location information are provided to a message platform. The message platform establishes time of day and compares sender identification information, originating device location information, and time of day information to prestored values to determine whether a special prestored message should be sent. If a message should be sent, the message platform initiates message transmission. Message transmission can be initiated if appropriate sender identification and location information are not received within a specified time window. The personal identification information, location information, and time of day information are furnished by three different devices operating independently of each other.

23 Claims, 4 Drawing Sheets

METHOD AND APPARATUS FOR INITIATING WIRELESS MESSAGES

FIELD OF THE INVENTION

This invention relates to wireless communications, and more particularly, to communications systems that allow a special message to be transmitted to a wireless device subscriber if certain conditions are met.

BACKGROUND OF THE INVENTION

Wireless communications devices such as cellular telephones and pagers are often used by family members to remain in touch with one another when conventional telephones cannot be used. In many households, parents use cellular telephones or pagers to monitor the after-school activities of their children. For example, it can be agreed beforehand that the child will place a call or page the parent once the child returns home after school. If desired, the child can send a paging message from his personal computer. However, if the child initiates the call or page, the parent will generally not be assured of the child's whereabouts, because the parent will not be sure of the location from which the cellular call or paging message originates.

To address this concern, the parent can call home to the child. However, the parent may not wish to be responsible for taking the initiative to place a telephone call. Even a conscientious parent may occasionally forget to call. And if the child is delayed for some reason, the parent may have to call home several times before reaching the child. Further, although the parent and child can attempt to keep such daily telephone calls brief, the calls may sometimes be perceived as intrusive, regardless of who initiates the call. What is needed is a way in which to overcome these problems.

SUMMARY OF THE INVENTION

The present invention provides a message processing system for initiating transmission of special wireless messages to a wireless device subscriber. The subscriber can be certain of both the location from which the message originates and the identity of the sender, because the transmission of the special message is only initiated if particular identification information is received in conjunction with particular location information. The identification information is used to assure the identity of the sender and the location information is used to assure the location of the sender. Thus, the wireless device subscriber can be sure that a particular sender is at a particular location.

The system has a message platform that receives the identification information and receives location information identifying the location from which the identification information has been sent. The message platform determines whether to initiate transmission of the special message by processing the identification information and the location information and may be programmed to require that this information be received during a certain time window.

In an advantageous embodiment of the invention, the sender sends the identification information from a personal computer equipped with a modem connected to a standard telephone line. The standard telephone line is connected to an end-office of the public switched telephone network (PSTN). The end-office of the PSTN connected to the telephone line generates automatic number identification (ANI) information. ANI information is generated and conveyed into the PSTN whenever a call is originated from such a standard telephone line. The ANI information is typically the sender's home telephone number, which therefore provides useful information indicative of the sender's particular location (i.e., the sender's home). The ANI information and the identification information are provided to a message platform, which processes this information, e.g., by comparing it to prestored data provided by the wireless device subscriber, to determine whether to initiate transmission of the special message. If the message is to be transmitted, the message platform initiates transmission of the special message to the wireless device (e.g., a pager) of the wireless device subscriber.

If desired, the transmission of the special message (in this instance an alerting message indicative of an exception condition) can be initiated when the correct identification information and the valid ANI information for that identification information are not received by the message platform within a certain time window. For example, if a wireless device subscriber wants to monitor the whereabouts of a sender (e.g., a child), the sender can be required to send the appropriate identification information to the message platform between, for example, 3:00 PM and 5:00 PM from a personal computer located in the sender's home. If the message platform does not receive the correct identification information and ANI information for that sender by 5:00 PM, the message platform will initiate transmission of the special message to the wireless device of the wireless device subscriber. Alternatively, the initiation of the transmission of the special message can be conditioned on receiving the correct identification information and valid ANI information for that identification information within a certain time window (e.g., 3:00 PM to 5:00 PM) or by a certain time (e.g., 5:00 PM).

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
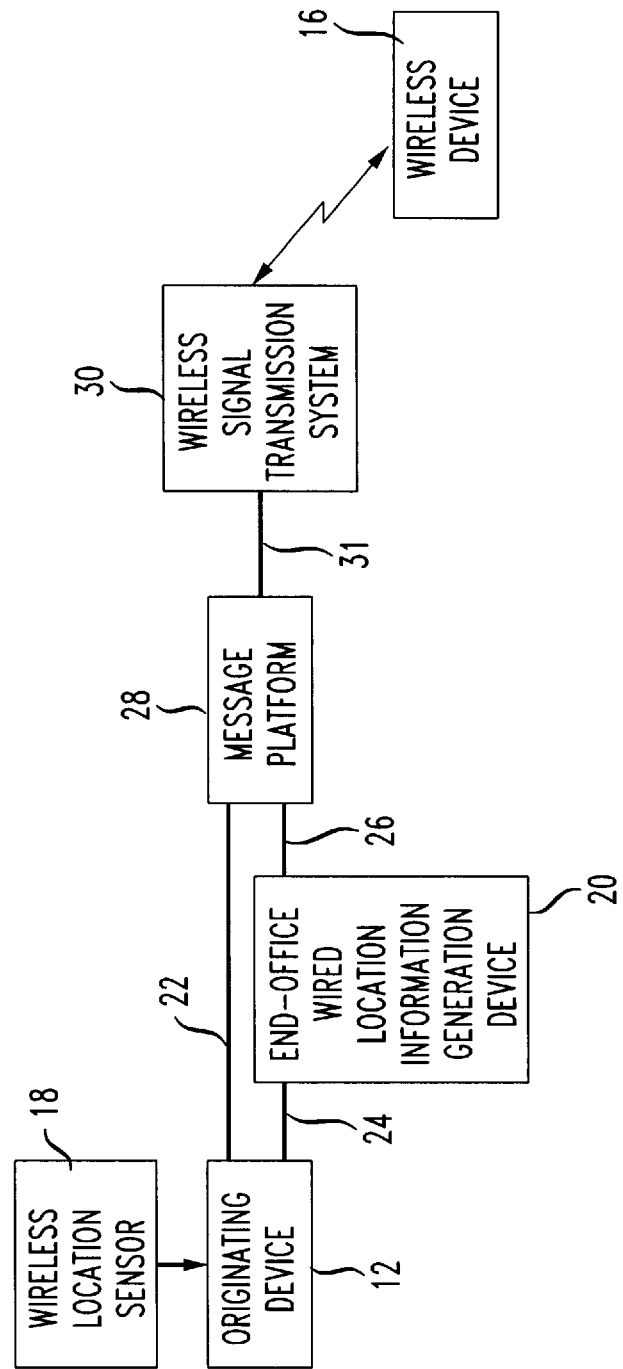
FIG. 1 is a block diagram of a communications system in accordance with the invention.

A communications system 10 in accordance with the present invention is shown in FIG. 1. Under certain conditions, a sender at originating device 12 can initiate the transmission of a special message from message platform 28 to wireless device 16. Preferably, at least two conditions must be satisfied before the special message will be sent: sender identification information must be sent to message platform 28 and the location of the sender at originating device 12 must be established.

The location of the sender at originating device 12 can be determined using either wireless location sensor 18 (e.g., a global positioning sensor (GPS) device) or wired location information generating device 20. If wireless location sensor 18 is used, the location information from wireless sensor 18 may be sent to message platform 28 via communication path 22. Communication path 22 may be a wireless link. Alternatively, the location information generated by wireless sensor 18 may be sent to message platform 28 via communication path 24, end-office wired location information generating device 20, and communication path 26. Communication path 24 is a physical wireline link.

If wired location information generating device 20 is used, the location information from wired location information generating device 20 is provided to message platform 28 via communication path 26.

Message platform 28 is connected to wireless transmission system 30 via communication path 31. message platform 28 may be at the same location as wireless transmission system 30 or message platform 28 and wireless transmission system 30 may be in geographically separated locations. If desired, message platform 28 and wireless transmission system 30 can share some or all components. Preferably, message platform 28 contains communication, clock (time of day), and data processing capabilities that allow message platform 28 to receive the location information and identification information, associate them with time of day, and process these data to determine whether to initiate transmission of the special message.

One suitable arrangement is for message platform 28 to contain a database of wireless device subscriber information. For each wireless device subscriber, the database contains information such as the wireless device subscriber's paging or cellular addressing information, the sender identification information chosen by the wireless device subscriber, location information specifying the originating device location from which the wireless device subscriber expects the identification information to be sent, the time of day interval during which the sender identification information is to be received by the platform, and the special message that the wireless device subscriber wishes to receive when it is determined that the identification information has been sent from the proper location or that it has not been sent within some specified time interval.

Any suitable scheme may be used to process the identification information and location information to determine whether the special message should be sent. For example, upon receiving a identification information from originating device 12, message platform 28 can perform a database search to determine if the identification information is the same as that previously provided to the database by a wireless device subscriber. If no match is found, the message platform will not initiate transmission of a special message. However, if the identification information received from the sender matches the value of prestored identification information previously provided to message platform 28 by the wireless device subscriber, message platform 28 will retrieve the location information corresponding to that value of identification information from the database. If the location information received by message platform 28 matches the value of the location information prestored in the database, message platform 28 will retrieve the contents of any prestored special message associated with the prestored identification information/location information pair from the database and will initiate transmission of the special message to wireless device 16 using the corresponding prestored addressing information.

Preferably, the special message that is transmitted to wireless device 16 is only known by the wireless device subscriber and message platform 28. Because the contents of the special message is only known by the wireless device subscriber and by message platform 28, it is virtually impossible for the sender to attempt to send the same message by some other route. As a result, the wireless device subscriber is assured that the message came from the sender when the sender was in the location corresponding to the prestored value of the location information. In addition, if message platform 28 is provided with the ultimate authority to determine which messages are transmitted to wireless device 16, message platform 28 can block the transmission of any message having the same contents as the prearranged special message unless transmission of the special message is initiated by message platform 28.

Various components can be used in the arrangement of FIG. 1. Originating device 12 can be a personal computer, a telephone, or a dedicated custom device. If it is desired to verify the identity of the sender before allowing the sender to send the identification information, originating device 12 can use a suitable security device, such as requiring a password or personal identification number (PIN). Alternatively, originating device 12 can perform voice print authentication or can transmit voice print data to a network processing facility such as a message platform which could perform the authentication. If desired, originating device 12 can provide security by measuring a physical attribute of the sender and comparing it to prestored information. For example, security can be provided by a fingerprint recognition device or a physical key may be required to be inserted into a socket to set or reset a locking device. Multiple senders may use originating device 12 to send identification information unique to each sender to message platform 28. By using one of the personal authentication mechanisms listed above, originating device 12 can positively identify the sender.

Wireless location sensor 18 may be a global positioning system (GPS) receiver that generates global positioning coordinates as the location information. Use of a GPS receiver assumes that its linkage to originating device 12 is secure and inviolate. Wired location information generating device 20 may be the end-office of a public switched telephone network (PSTN). If wired location information generating device 20 is an end-office, the location information generated by wired location information generating device 20 is preferably automatic number identification (ANI) information (equivalent to the sender's telephone number). Use of wired location information rests on the knowledge that a physical link installed by a trusted public utility connects the PSTN end-office with the location of the originating device.

Communication paths 22 and 26 may be any suitable electrical or radio frequency data path or combination of electrical and radio frequency data path. Communication path 24 must be a physical wire facility. For example, communication path 22 can be the PSTN or may be a wireless data transmission path established between a cellular telephone modem in originating device 12 and message platform 28. If desired, a suitable Internet communication path can be used. If wired location information generating device 20 is an end-office, communication path 24 is a plain old telephone service (POTS) line connecting originating device 12 directly to the end-office and communication path 26 is preferably the PSTN.

Message platform 28 is preferably based on a computer system containing a microprocessor, mass storage, memory, a clock circuit, and communications and control circuitry. The computer system implements a database for storing the information necessary to determine when and where messages are to be sent. Message platform 28 can accept the prestored originating location information, prestored personal identification information, prestored time interval, prestored special message, and prestored addressing information either by manual data input, or via a data line from an external source. For example, a wireless device subscriber may orally communicate the prestored location information, prestored identification information, prestored time interval, prestored special message, and prestored addressing information to an operator, who subsequently enters these prestored values into the database. Alternatively, the wireless device subscriber may telephone message platform 28 and enter the prestored information in the form of dual-tone multifrequency pulses from a conventional touch-tone keypad. The prestored information could also be transmitted from the wireless device subscriber to message platform 28 using a computer and a modem.

If desired, parameters in addition to the identification information and location information can be used to determine whether to initiate message transmission. For example, the wireless device subscriber could further specify that the message be transmitted to wireless device 16 only when the time at which the identification information is sent falls within a certain time window. In addition, the non-transmission of the special message can be conditioned on the same parameters upon which transmission can be conditioned. With this type of arrangement, message platform 28 only initiates transmission of the message when, for example, the identification information and location information are not received within the given time window. In general, the most useful parameters upon which to condition message transmission include parameters based on location (e.g., ANI), personal identity (e.g., password or identification information), and time.

If desired, the message that is sent may indicate that all is well (e.g., a child has safely returned home after school) or may indicate a situation of particular urgency (e.g., a babysitter wishes a parent to call home immediately upon receipt of the message). The wireless device subscriber determines which type of message is desired when selecting the prestored identification information, prestored location information, prestored time interval, prestored addressing information, and prestored special message that are provided to message platform 28.

Wireless signal transmission system 30 may be, for example, a paging system or a cellular telephone network. If wireless signal transmission system is a paging system, the prestored message that is transmitted to wireless device 16 depends on the capabilities of wireless device 16. If wireless device 16 is a tone pager, the message simply prompts wireless device 16 to emit a tone. Wireless device 16 can use any suitable indicator to signal the reception of this type of message, such as an indicator that generates a vibration, emits light, or displays alphanumeric characters. If wireless device 16 is a voice pager, the message is a prerecorded voice signal.

If wireless device 16 has numeric or alphanumeric capabilities, the message can be numeric or alphanumeric. For example, if the wireless device subscriber selects a prestored identification information of 99999, and a prestored special message of "ALL OK", when the identification information 99999 is sent from the correct location, message platform 28 will direct wireless signal transmission system 30 to transmit the alphanumeric special message "ALL OK" to wireless device 16.

If wireless device 16 is a cellular telephone, the message may be a prerecorded voice message. Message platform 28 stores the voice message using, for example, its mass storage device.

If wireless device 16 is a cellular telephone with alphanumeric messaging capabilities, the message may be either an alphanumeric message or a prerecorded cellular telephone message. Preferably, cellular telephones with alphanumeric messaging capabilities operate in accordance with TIN/EIA Interim Standard IS-136.1, 800 MHz TDMA Cellular—Radio Interface—Mobile Station—Base Station Compatibility—Digital Control Channel, December 1994, Telecommunications Industry Association, which is hereby incorporated herein by reference.

Although the computer processing capabilities of message platform 28 are advantageously provided by circuitry contained within message platform 28, comparable circuitry may be provided within wireless signal transmission system 30. Thus, while the message platform may be configured as a stand-alone system that can interface with existing paging or cellular systems, it is also possible to integrate the data processing capabilities of message platform 28 into a paging or cellular system.

Figure 2:
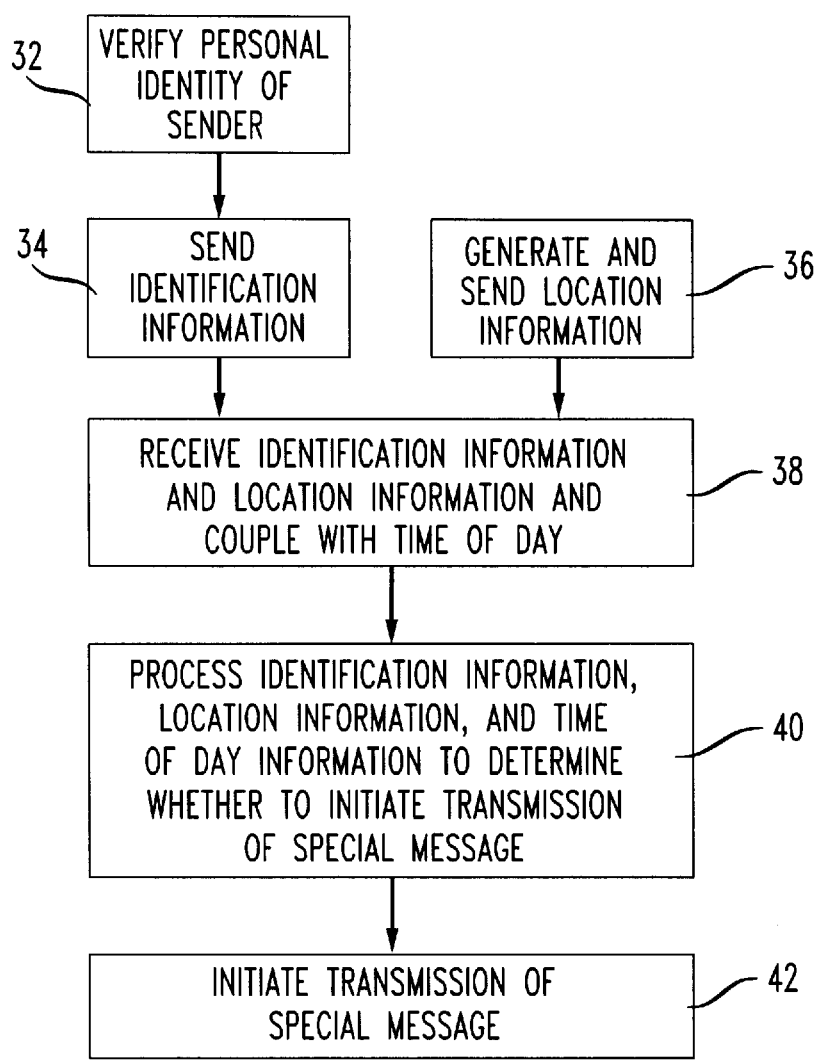
FIGS. 2 and 3 are flow charts of steps involved in operating the system of FIG. 1.
Figure 3:
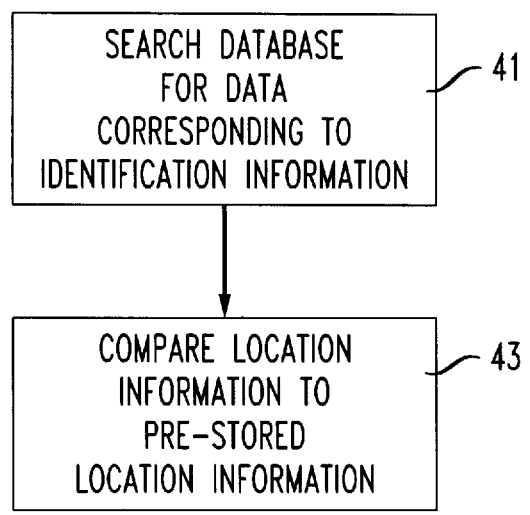

Some of the steps performed during the operation of communications system 10 are shown in FIGS. 2 and 3. At step 32 in FIG. 2, the sender's identity is verified, for example, by entering a password into originating device 12. At step 34, the sender causes originating device 12 to send the identification information. Wireless location sensor 18 or wired location information generating device 20 is used to generate location information and to send the location information at step 36. Message platform 28 receives the identification information and location information at step 38. At step 40, message platform 28 processes the received identification information and location information and using time of day determines whether to initiate the transmission of a message. The step of initiating message transmission is performed by message platform 28 at step 42. The decision of whether to initiate message transmission can be based on the location information and identification information processing of step 40 alone. If desired, message transmission can be conditioned on additional parameters such as the reception of the identification information before a certain time or during a specified time window. In addition, it may be desired to transmit the message only when the proper identification information and location information are not received by a prestored time or within a specified time window.

One suitable set of steps for processing the identification information and location information with message platform 28 (step 40 of FIG. 2) is shown in FIG. 3. At step 41, message platform 28 searches its database for a data entry corresponding to the identification information received from the sender.

In particular, at step 41, the database in message platform 28 is searched for prestored location information corresponding to the identification information from the sender. If no data entry in the message platform database is found that matches the identification information from the sender, message transmission is not initiated. Because the identification information is preferably unique to each wireless device subscriber, locating a data entry allows the corresponding values of the prestored location information, prestored time window information, prestored special message, and prestored addressing information to be obtained for that wireless device subscriber. If a match is found for the identification information at step 41, message platform 28 compares the location information received from wireless location sensor 18 or wired location information generating device 20 at step 38 (FIG. 2) with the value of the prestored location information retrieved at step 41. If the location information received at step 38 matches the prestored location information, then pending time window information constraints, message transmission is initiated (at step 42 of FIG. 2).

Figure 4:
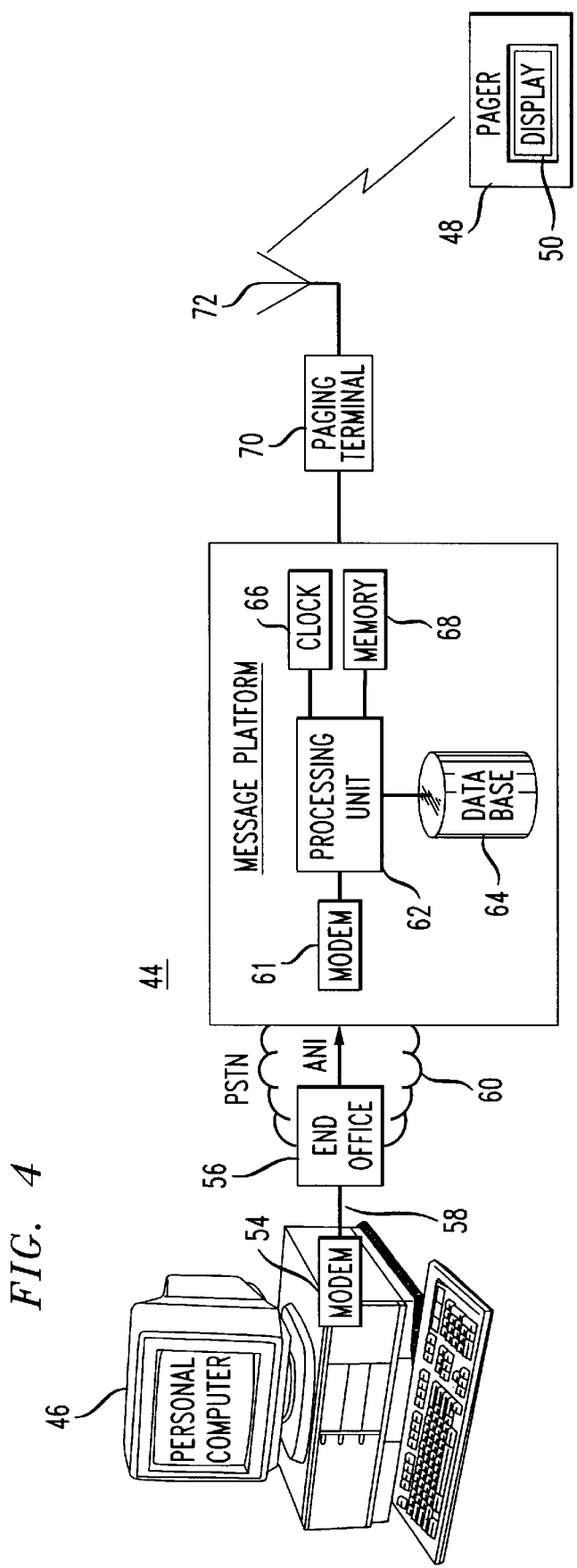
FIG. 4 is a block diagram of a preferred embodiment of the system of FIG. 1.

An advantageous embodiment of communication system 10 of FIG. 1 is shown in FIG. 4. In communication system 44, a sender uses personal computer 46 to cause an alphanumeric message (e.g., "ALL OK") to be transmitted to the wireless device subscriber of pager 48 and displayed on display 50.

The wireless device subscriber provides the prestored special message "ALL OK", prestored identification information (e.g., 99999), and prestored addressing information (e.g., the pager address of pager 48) to message platform 52. When the sender initiates a call from originating device 12 to messaging platform 28, location information (the wireless device subscriber's ANI or home telephone number), is introduced into the signal path by end-office equipment 56.

Wireline location information is established through the installation of physical facilities by a trusted public utility. The wireline location information never passes through originating device 12 and so may not be therein corrupted. Relocating the physical facility originally installed at the sender's location (e.g., the sender's home) to some other location is sufficiently impractical to make it unimportant. The situation is most resistant to corruption when an action is contingent upon a match amongst three data—person, place, and time that are supplied by different and independent devices. It is even more resistant to corruption when two of the three data are supplied by public utilities or bona fide enhanced service providers.

After the sender has entered an appropriate password (if desired to establish authenticity), personal computer 46 grants the sender access to a suitable icon that triggers the sending of the personal identification information. When the icon is triggered by the sender, modem 54 makes a telephone connection with end-office 56 via POTS line 58. End-office 56 introduces the ANI information for the outbound telephone call from modem 54 into the signal path of the call. The call makes its way via the PSTN 60 to the modem 61 associated with message platform 52. Establishing a call between modem 54 and modem 61 enables the identification information and the location information to be conveyed to message platform 52.

Message platform 52 preferably contains processing unit 62, database storage unit 64, clock 66, and memory 68. The information provided by the wireless device subscriber to message platform 52 is prestored in database storage unit 64. Processing unit 62 executes instructions stored in memory 68. Processing unit 62 processes the identification information and ANI (or GPS location) information received from PSTN 60 to determine whether to page the wireless device subscriber. If the correct identification information and corresponding valid ANI information are received from PSTN 60 and if desired time window constraints are met, message platform 52 sends control and data signals to paging terminal 70 to initiate transmission of the prestored paging message ("ALL OK") to pager 50 via antenna 72.

If desired, the special message can be sent whenever the correct identification information and the valid ANI information for that identification information are not received by message platform 52 within a time window (e.g., 3:00 PM to 5:00 PM). For example, if a wireless device subscriber wants to monitor the whereabouts of a sender (e.g., a child), the sender can be required to send the appropriate identification information to message platform 52 between 3:00 PM to 5:00 PM from personal computer 46 when it is located within the sender's home and therefore attached to his regular home telephone line. If message platform 52 does not receive the identification information and ANI information for that sender by 5:00 PM, the wireless device subscriber will be paged (e.g., with the special message "NOT HOME"). Alternatively, the initiation of the transmission of the special message can be conditioned on receiving the correct identification information and valid ANI information for that identification information within a certain time window (e.g., 3:00 PM to 5:00 PM) or by a certain time (e.g., 5:00 PM).

Clock 66 can be used for time-based functions. For example, clock 66 can be used to determine the time at which certain identification information is received by message platform 52. Message platform 52 can determine whether to initiate transmission of special messages based on whether the time falls within the prestored time window.

The foregoing is merely illustrative of the principles of this invention and various modifications can be made by those skilled in the art without departing from the scope and spirit of the invention.

What is claimed is:

1. A method for operation of a message processing system for initiating the transmission of a stored message to a wireless device, the method comprising the steps of:
   receiving identification information sent from an originating device;
   receiving location information representing the location of said originating device;
   comparing said received identification information and location information with a stored pre-associated identification information and location information pair; and
   initiating a message to said wireless device only if said received location information and identification information match the stored pre-associated identification information and location information pair.

2. The method of claim 1 further comprising the step of:
   determining the time at which said identification information and location information are received and initiating said message only if the time at which said identification information and location information are received is within a pre-stored time window corresponding to said identification information and location information pair.

3. The method of claim 1 where a telephone line is connected to said origination device, said step of recieving location information representing the location of said originating device comprising the step of:
   receiving automatic number identification (ANI) information.

4. The method of claim 3 wherein said step of receiving identification information comprises the step of:
   receiving identification information sent via dual tone multifrequency pulses.

5. The method of claim 1 wherein said originating device is a wireless device and wherein said location information is global positioning system coordinates.

6. The method of claim 1 wherein said step of initiating a message further comprises the step of sending a paging message to a paging terminal.

7. The method of claim 1 wherein said originating device is a computer.

8. A message platform for initiating a stored message to a wireless device based on location information and identification information received from an originating device, comprising:
   means for receiving identification information sent from the originating device;

means for receiving location information representing the location of said originating device;

a memory for storing a pre-associated identification information and location information pair;

means for comparing said received identification information and location information with said stored pre-associated identification information and location information pair; and means for initiating said message to said wireless device only if said received location information and identification information match the stored pre-associated identification information and location information pair.

9. The message platform of claim 8 further comprising:

said memory means further storing a time window associated with said identification information and location information pair; and means for determining the time at which said identification information and location information are received and initiating said message only if the time said identification information and location information are received is within the time window associated with said identification information and location information pair.

10. The message platform of claim 8 wherein said means for receiving location information comprises:

means for receiving automatic number identification (ANI) information.

11. The message platform of claim 10 wherein said means for receiving identification information comprises:

means for receiving identification information sent via dual tone multifrequency pulses.

12. The message platform of claim 8 wherein said originating device is a wireless device and wherein said location information is global positioning system coordinates.

13. The message platform of claim 8 wherein said means for initiating a message further comprises means for sending a paging message to a paging terminal.

14. The message platform of claim 8 wherein said originating device is a computer.

15. A message platform for initiating a stored message to a wireless device based on location information and identification information received from an originating device, comprising:

a database storing a pre-associated location information and identification information pair;

a processing unit coupled to said database for comparing said received location information and identification information with said stored pre-associated location information and identification information pair, and for initiating said message to a wireless device only if said received location information and identification information match the stored pre-associated identification information and location information pair.

16. The message platform of claim 15 further comprising:

clock circuitry, wherein said processing unit is configured for using said clock circuitry to determine the time at which said identification information and location information are received, and initiating said message only if the time at which said identification information and location information are received is within a pre-stored time window corresponding to said identification information and location information pair.

17. The message platform of claim 15 wherein said processing unit is configured for receiving automatic number identification (ANI) information.

18. The message platform of claim 17 wherein said processing unit is configured for receiving identification information sent via dual tone multifrequency pulses.

19. The message platform of claim 15 wherein said originating device is a wireless device and wherein said location information is global positioning system coordinates.

20. The message platform of claim 15 wherein said processing unit is configured for initiating a paging message to a paging terminal.

21. A message platform for initiating a stored message to a wireless device, comprising:

a memory for storing a pre-associated identification information and location information pair and a time window associated with said pair;

means for initiating said message to said wireless device if said preassociated identification information and location information pair is not received from an originating device at said message platform during said time window.

22. The message platform of claim 21 wherein said originating device is a computer.

23. The message platform of claim 21 wherein said location information is automatic number identification (ANI) information.

* * * * *